Sept. 10, 1935.　　　　F. TYSON　　　　2,013,814
ROLLER BEARING
Filed June 21, 1934
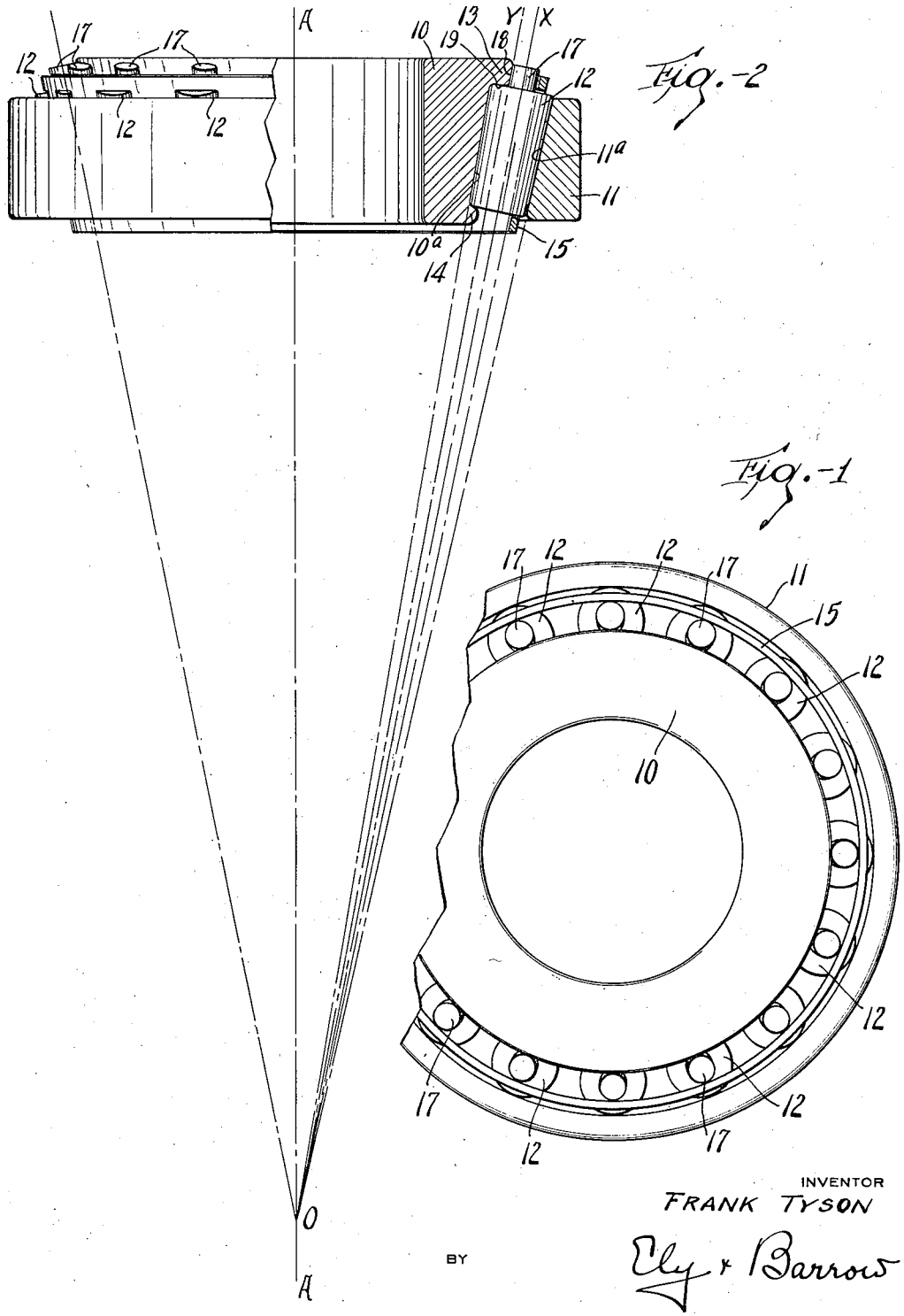
INVENTOR
FRANK TYSON
BY
Ely & Barrow
ATTORNEYS Patented Sept. 10, 1935

2,013,814

UNITED STATES PATENT OFFICE 2,013,814

ROLLER BEARING

Frank Tyson, Canton, Ohio

Application June 21, 1934, Serial No. 731,578

4 Claims. (Cl. 308—214)

This invention relates to roller bearings, and more especially it relates to tapered roller bearings designed to take up radial pressure and axial thrust.

In the operation of bearings of the character mentioned there is a continual tendency for the tapered rollers to move out of their normal positions, either by sliding axially or by tilting or rocking so that their axes are disposed obliquely to their direction of rolling. The reasons for such movements of the rollers need not here be discussed. The resisting of such movement of the rollers usually is one of the functions of the cage that is provided for keeping the rollers in laterally spaced relation to avoid friction between the rollers, but such rocking of the rollers has caused such friction between rollers and cage that the ribs or bars of the cage have been ground to convex form.

The chief objects of this invention are to provide a roller bearing structure wherein the rollers are restrained against displacement obliquely to their direction of rolling; to provide against axial displacement of the rollers along their respective axes; and to eliminate friction between the cage and rollers due to tilting or rocking of the latter. Another important object is to prevent the rollers from being thrown radially outwardly by centrifugal force away from the cone or inner race. A more specific object is to provide a roller bearing structure having an end thrust flange that engages the rollers within the conical locus of the axes of revolution of the rollers, said flange being so shaped that, in cooperation with complementally shaped formations on the rollers, it achieves the aforesaid objects.

Of the accompanying drawing,

Figure 1 is a plan view of a roller bearing embodying the invention in its preferred form; and Figure 2 is a side elevation thereof, partly in diametric section.

Referring to the drawing, the improved roller bearing comprises the usual cone 10, cup 11, and rollers 12, 12 mounted for rotation upon and between inner and outer raceways 10a, 11a, respectively, on the cup and cone. There is a pressure or thrust flange 13 at the large end of the cone 10, preferably integral therewith, and an integral guide flange 14 at the small end of the cone. The usual cage 15 is provided, outside the conical locus of the axes of revolution of the rollers, for retaining the latter on the cone when the cup 11 is removed. As is most clearly shown in Figure 2, the raceways 10a, 11a are conical and the rollers 12 are frusto-conical, said raceways and rollers having a common apex or cone origin O located on the axis A—A of the bearing. The axis of rotation of each roller 12 is indicated by the line O—X.

At its larger end each roller 12 is formed with an axial pintle 17 that is frusto-conical in shape and has its apex at the common apex O, said pintle being generated by rotation of line O—Y about roller axis O—X. The end face of roller 12, from which pintle 17 extends, is perpendicular to roller axis O—X. The arrangement is such that pintle 17 is slightly flared, or otherwise stated, is slightly undercut with relation to the roller.

The peripheral or conical surface of pintle 17 normally contacts the outer peripheral face 18 of thrust flange 13, being held thereagainst by cup 11 when the bearing is in assembled condition. The peripheral face 18 of flange 13 is frusto-conical in shape, being generated by rotation of line O—Y about the bearing axis A—A. Because the lines O—X and O—Y are convergent instead of parallel, there is a mechanical interlock between pintle 17 and flange face 18 such as will prevent roller 12 from moving longitudinally along its axis O—X toward guide flange 14, with the result that wear of the latter is obviated and the roller retained in its proper position axially of the bearing. Moreover, the aforesaid mechanical interlock serves to restrain the roller against rocking or tilting upon the thrust face of flange 13 such as would displace the roller obliquely to its direction of rolling.

The end face of roller 12, outwardly of pintle 17, rests flush against annular thrust face 19 of flange 13. Since the end face of roller 12 is perpendicular to roller axis O—X, it will be apparent that thrust face 19 is oblique and undercut with relation to the plane of the bearing. The arrangement is such that the juncture of thrust face 19 and inner raceway 10a is an acute angle, and the juncture of peripheral face 18 with thrust face 19 is an acute angle, the latter juncture overhanging the first mentioned juncture radially of the bearing. Thus there is provided a mechanical interlock between the rollers 12 and thrust face 19 of flange 13 such as will prevent the rollers from being thrown radially outwardly by centrifugal force, away from inner raceway 10a.

The invention is relatively simple in construction yet it accomplishes the several objects set out in the foregoing statement of objects, whereby the bearing runs smoother and has longer useful life than bearings heretofore provided.

Modification may be resorted to without departing from the spirit of the invention or the scope of the appended claims, which are not limited wholly to the specific construction shown and described.

What is claimed is:

1. In a roller bearing, the combination of a cone having a frusto-conical outer raceway, a cup having a frusto-conical inner raceway, a plurality of tapered rollers rolling on and between said raceways, said rollers being formed with frusto-conical axial extensions on their large ends, and a circumferential, radially extending, pressure flange at the large end of the inner raceway, the peripheral face of the flange being of frusto-conical shape and contacting with said frusto-conical axial extensions on the large ends of the rollers, the cones of said raceways, rollers, flange and roller extensions being generated from a common apex.

2. A roller bearing comprising a cone having a tapered outer raceway surface, a plurality of tapered rollers rolling on said raceway and formed with respective frusto-conical extensions on their large ends, a circumferential laterally undercut pressure flange at the larger end of the cone adapted to receive end thrust of the rollers, said flange having a cone surface on its periphery generated from the common cone origin and adapted to contact said frusto-conical extensions on the rollers, whereby end thrust is absorbed and the rollers stabilized in proper relation on the cone.

3. A combination as defined in claim 2 in which the end faces of the rollers are perpendicular to their respective axes of rotation, and bear flush against the thrust face of the flange.

4. A roller bearing comprising a cone formed with an outer raceway, a circumferential laterally undercut pressure flange at the large end thereof, and a plurality of rollers rolling on said raceway, each of said rollers being formed with an axial pintle, the end faces of the rollers engaging the laterally undercut face of said flange and the pintles engaging the peripheral face of said flange, the construction and arrangement being such as to provide an interlock of the flange, pintles, and rollers whereby movement of the latter along their axes of rotation, and/or radially of the bearing is restrained.

FRANK TYSON.